(12) United States Patent
Phillips et al.

(10) Patent No.: US 9,584,598 B2
(45) Date of Patent: Feb. 28, 2017

(54) METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK

(71) Applicant: Ericsson Television Inc., Duluth, GA (US)

(72) Inventors: Chris Phillips, Hartwell, GA (US); Jennifer Ann Reynolds, Duluth, GA (US); Robert Hammond Forsman, Sugar Hill, GA (US); Jimmie Rodgers, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 394 days.

(21) Appl. No.: 13/856,895

(22) Filed: Apr. 4, 2013

(65) Prior Publication Data
US 2014/0304372 A1   Oct. 9, 2014

(51) Int. Cl.
| H04N 21/61 | (2011.01) |
| H04N 21/23 | (2011.01) |
| G06F 15/16 | (2006.01) |
| H04L 29/08 | (2006.01) |

(52) U.S. Cl.
CPC ................................ *H04L 67/1095* (2013.01)

(58) Field of Classification Search
CPC ........... G06F 17/30899; G06F 12/0812; H04L 29/06; H04L 67/22
See application file for complete search history.

(56) References Cited

U.S. PATENT DOCUMENTS

| 7,324,555 | B1* | 1/2008 | Chen et al. .................. 370/468 |
| 7,680,897 | B1* | 3/2010 | Carter et al. ................ 709/217 |
| 2002/0126698 | A1* | 9/2002 | Deshpande .................. 370/467 |
| 2005/0193114 | A1 | 9/2005 | Colby et al. |
| 2008/0215747 | A1* | 9/2008 | Menon et al. ................ 709/231 |
| 2009/0254663 | A1 | 10/2009 | Alperovitch et al. |
| 2010/0095016 | A1 | 4/2010 | Zuckerman et al. |
| 2010/0111104 | A1 | 5/2010 | Luss |
| 2012/0096167 | A1 | 4/2012 | Free et al. |
| 2012/0291076 | A1 | 11/2012 | Armstrong et al. |
| 2014/0258449 | A1* | 9/2014 | Holden .................. H04L 65/60 709/217 |

FOREIGN PATENT DOCUMENTS

WO   WO 2013/043821 A1   3/2013

OTHER PUBLICATIONS

Bhide, "Adaptive Push-Pull: Disseminating Dynamic Wed Data", Jun. 2002, IEEE, vol. 51 No. 6, p. 657-659.*
Huang, et al.: "Dynamic Push-Pull Channel Allocation Framework for Mobile Data Broadcasting". vol. 5. No. 8, Aug. 2006.

* cited by examiner

*Primary Examiner* — Umar Cheema
*Assistant Examiner* — Anthony Rotolo

(57) ABSTRACT

A method of operating a content delivery network includes assigning priority levels to push and pull content requests, respectively, for a communication link connecting a first server and a second server in the content delivery network and allocating a push portion of outgoing bandwidth from the first server to the second server for push content requests and a pull portion of the outgoing bandwidth from the first server to the second server for pull content requests based on the priority levels assigned to the push and pull content requests for the communication link, respectively.

21 Claims, 9 Drawing Sheets

METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK

TECHNICAL FIELD

The present disclosure relates to communication networks and, more particularly, to allocation of bandwidth for delivering content in a content delivery network.

BACKGROUND

Content providers have long struggled with how to provide content at a high availability and high performance to their customers in view of bandwidth limitations in content distribution networks. A Content Delivery Network (CDN) can be a large distributed system of servers deployed in multiple data centers connected to the Internet or other public/private communication network. The goal of a CDN is to serve media content (e.g., video/audio/etc.) to User Equipment nodes (UEs) with high availability and high performance. Example UEs that can receive media content are set-top-boxes, television, multimedia computers, and wireless terminals (e.g., smart phones and tablet computers).

Requests from UEs for media content are typically algorithmically directed to CDN servers that are optimal in some way. CDNs deliver files from a central location/data center, which may be owned, managed, and/or associated with a content owner, to various regional servers and finally to edge servers or the UE nodes, which are located near the end users. Such systems often operate on a "pull" philosophy, with servers farther away from the edge caching content on servers closer to the edge. Servers in the CDN will typically redirect a client to a location somewhere in the hierarchy of servers based on where the content resides. If the content is determined to be popular at a given location, then users may be redirected to an edge server closer to the location of that user. There are "push" scenarios as well where, for example, Video on Demand (VOD) content may be pushed throughout the CDN based on licensing window information and/or anticipated content popularity. For example, a title that was popular in theaters and is due to be released in one week may be pushed out to various nodes in the CDN to meet the expected purchase/viewing demands.

CDNs, however, generally have limited ability to prioritize/optimize the distribution of file transfers as content is generally delivered on a best effort scenario throughout the CDN nodes, including the edge nodes. There are limited ways to prioritize particular content files or content associated with particular owners/operators based on popularity or other criteria. Moreover, CDNs generally lack the ability to prioritize content delivery between push and pull content delivery scenarios and/or within the push and pull content pipes throughout a CDN.

SUMMARY

Some embodiments are directed to a method of operating a content delivery network including assigning priority levels to push and pull content requests, respectively, for a communication link connecting a first server and a second server in the content delivery network and allocating a push portion of outgoing bandwidth from the first server to the second server for push content requests and a pull portion of the outgoing bandwidth from the first server to the second server for pull content requests based on the priority levels assigned to the push and pull content requests for the communication link, respectively.

Advantageously, embodiments of the present inventive subject matter may provide improved CDN bandwidth utilization by dynamically allocating bandwidth to push and pull pipes as well as the streams of individual content files within those pipes based on desired priorities at the pipe level as well as the content file level. Moreover, embodiments of the inventive subject matter may allow lower priority content files to be transferred using push pipes in the CDN whose bandwidth is adjusted accordingly to deliver the files when they are needed at a destination while preserving as much bandwidth as possible to service higher priority user requests via a pull pipes in the CDN.

Priorities may also be assigned to individual content files to be transmitted via the push and/or pull bandwidth portions. For example, the method may further include assigning priority levels to a first plurality of content files destined for the second server, assigning priority levels to a second plurality of content files destined for the second server, allocating a plurality of portions of the push portion of the outgoing bandwidth from the first server to the second server to the first plurality of content files, respectively, based on the priority levels assigned to the first plurality of content files, and allocating a plurality of portions of the pull portion of the outgoing bandwidth from the first server to the second server to the second plurality of content files, respectively, based on the priority levels assigned to the second plurality of content files.

The priorities assigned to the push and pull bandwidth portions may be based on a variety of criteria including, but not limited to, the current state of content distribution in the CDN and/or the time of day. The priorities to individual content files within the push and/or pull bandwidth portions may also be based on a variety of criteria including, but not limited to, when the content files will be access from an edge server, which edge nodes the content files are destined for, whether the content files are associated with a Video on Demand (VOD) service, whether the content files are associated with live subject matter occurring in real time, and/or the current state of content distribution in the CDN.

Other methods, apparatus, and computer program products according to embodiments of the inventive subject matter will be or become apparent to one with skill in the art upon review of the following drawings and detailed description. It is intended that all such additional methods, apparatus, and computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Some embodiments are directed to a content delivery network in which the outgoing bandwidth from a server is subdivided into a push portion and a pull portion for handling push content requests and pull content requests, respectively. The sizes of the push and pull portions of the bandwidth are based on relative priorities assigned to push and pull content requests. In addition to allocating respective bandwidth portions for push and pull content requests based on relative priorities assigned to the push and pull categories, priorities may also be assigned to individual content files to be transmitted via the push and/or pull bandwidth portions. The bandwidths allocated to the respective content files may be based on the relative priorities assigned to the respective files in both the push and pull bandwidth portions. The priorities assigned to the push and pull bandwidth portions may be based on a variety of criteria including, but not limited to, the current state of content distribution in the Content Delivery Network (CDN) and/or the time of day. So as not to waste usable bandwidth, when there are no pull content requests, the pull bandwidth portion may be allocated to service push requests and vice versa. The priorities to individual content files within the push and/or pull bandwidth portions may also be based on a variety of criteria including, but not limited to, when the content files will be access from an edge server, which edge nodes the content flies are destined for, whether the content files are associated with a Video on Demand (VOD) service, whether the content files are associated with live subject matter occurring in real time, and/or the current state of content distribution in the CDN. Embodiments of the present inventive subject matter may, therefore, allow for dynamic bandwidth allocation across push and pull bandwidth portions or pipes as well as the streams of individual content files within those pipes based on desired priorities at the pipe level as well as the content file level.

Figure 1:
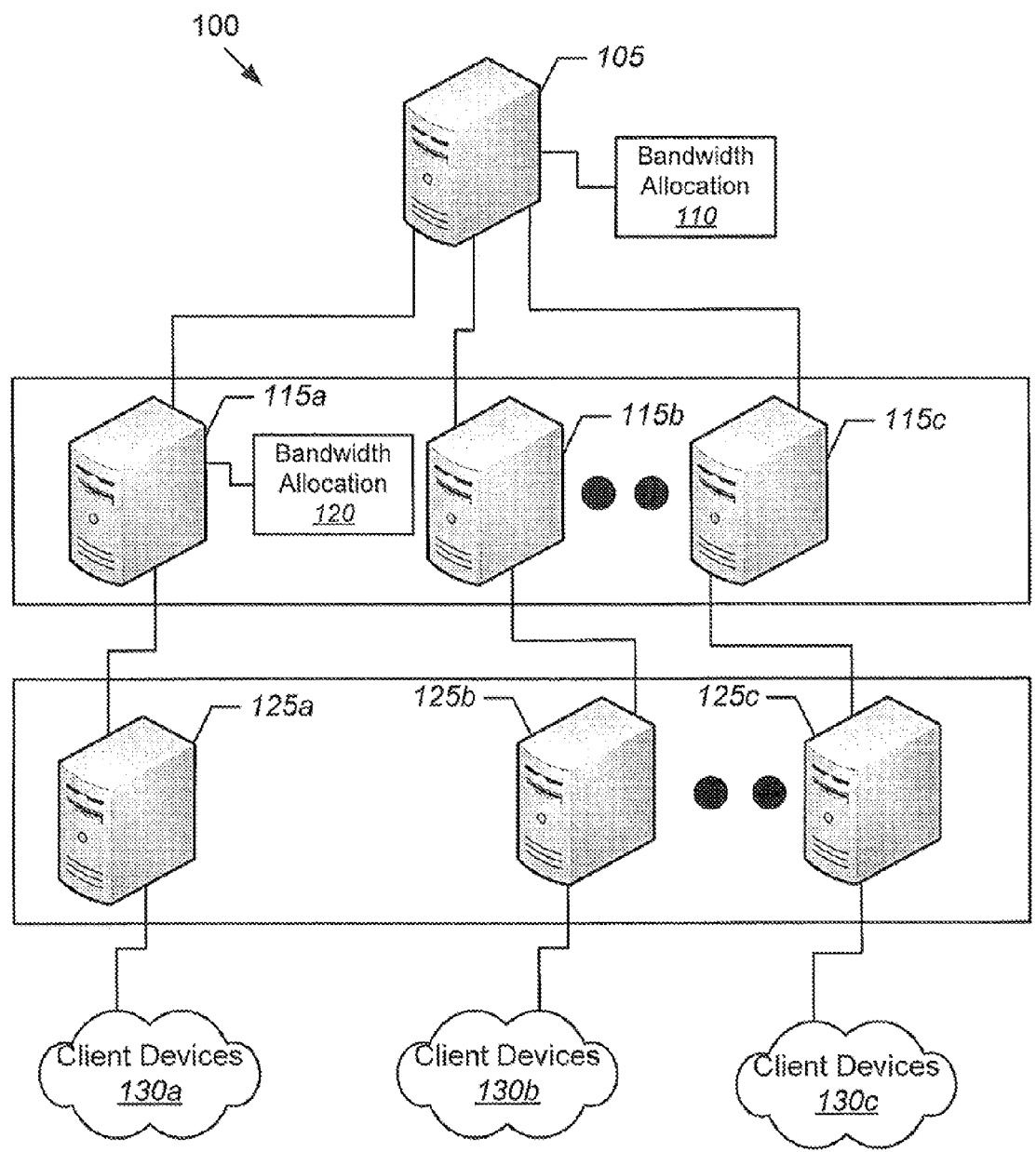
FIG. 1 is a block diagram of a is a block diagram of a Content Delivery Network (CDN) according to some embodiments of the inventive subject matter.

FIG. 1 is a block diagram of a CDN 100 according to some embodiments of the inventive subject matter. The CDN includes a central data center node server 105 that is coupled of a plurality of regional nodes comprising servers 115a, 115b, and 115c, which are in turn coupled to a plurality of edge nodes comprising servers 125a, 125b, and 125c. The edge nodes 125a, 125b, and 125c serve content to User Equipment (UE) nodes, which are represented by client devices 130a, 130b, and 130c. As shown in FIG. 1, the central data center server 105 includes a bandwidth allocation module 110 and the regional server 115a includes a bandwidth allocation module 120. The bandwidth allocation modules 110 and 120 may be configured to assign priority levels to push and pull content requests and to allocate bandwidth between a push portion and a pull portion of the outgoing bandwidth on a communication link based on the assigned priority levels. The bandwidth allocation modules 110 and 120 may also be configured to allocate bandwidth to individual content files within the push and pull bandwidth portions based on relative priorities assigned to the respective content files. Although the regional server 115a is the only regional server shown with a bandwidth allocation module, it will be understood that other regional servers may likewise include a bandwidth allocation module like the bandwidth allocation module 120. Furthermore, although only one level of regional nodes 115a, b, c is shown between the central data center node 105 and the edge nodes 125a, b, c, it will be understood that multiple levels of regional nodes may exist between the central data center node 105 and the edge nodes 125a, b, c in accordance with various embodiments of the inventive subject matter.

Although FIG. 1 illustrates an exemplary CDN according to some embodiments of the inventive subject matter, it will be understood that the present invention is not limited to such configurations, but is intended to encompass any configuration capable of carrying out the operations described herein.

Figure 2:
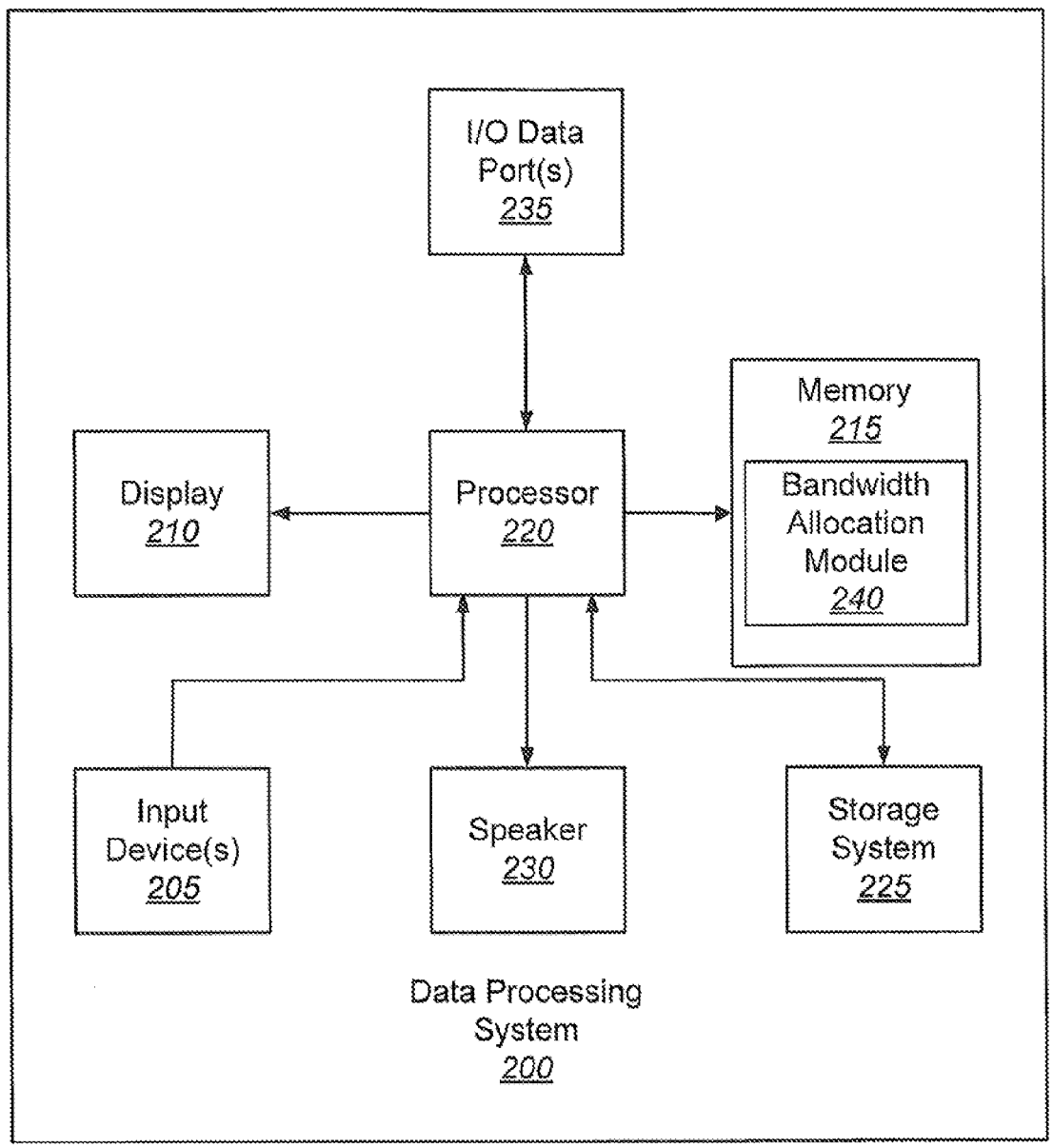
FIG. 2 is a block diagram that illustrates a data processing system including a bandwidth allocation module that may implement a server in the CDN of FIG. 1 according some embodiments of the inventive subject matter.

FIG. 2 illustrates a data processing system 200 that may be used, for example, to implement the central data center node server 105 and the regional server 115a of FIG. 1 and may include a bandwidth allocation module, in accordance with some embodiments of the inventive subject matter. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a bandwidth allocation module 240 that may be used to allocate the bandwidth assigned to push and pull content requests on an outgoing communication link based on relative priorities assigned to the push and pull content requests and also allocate bandwidth to individual content files within a push bandwidth portion or pipe and/or a pull bandwidth portion or pipe.

Figure 3:
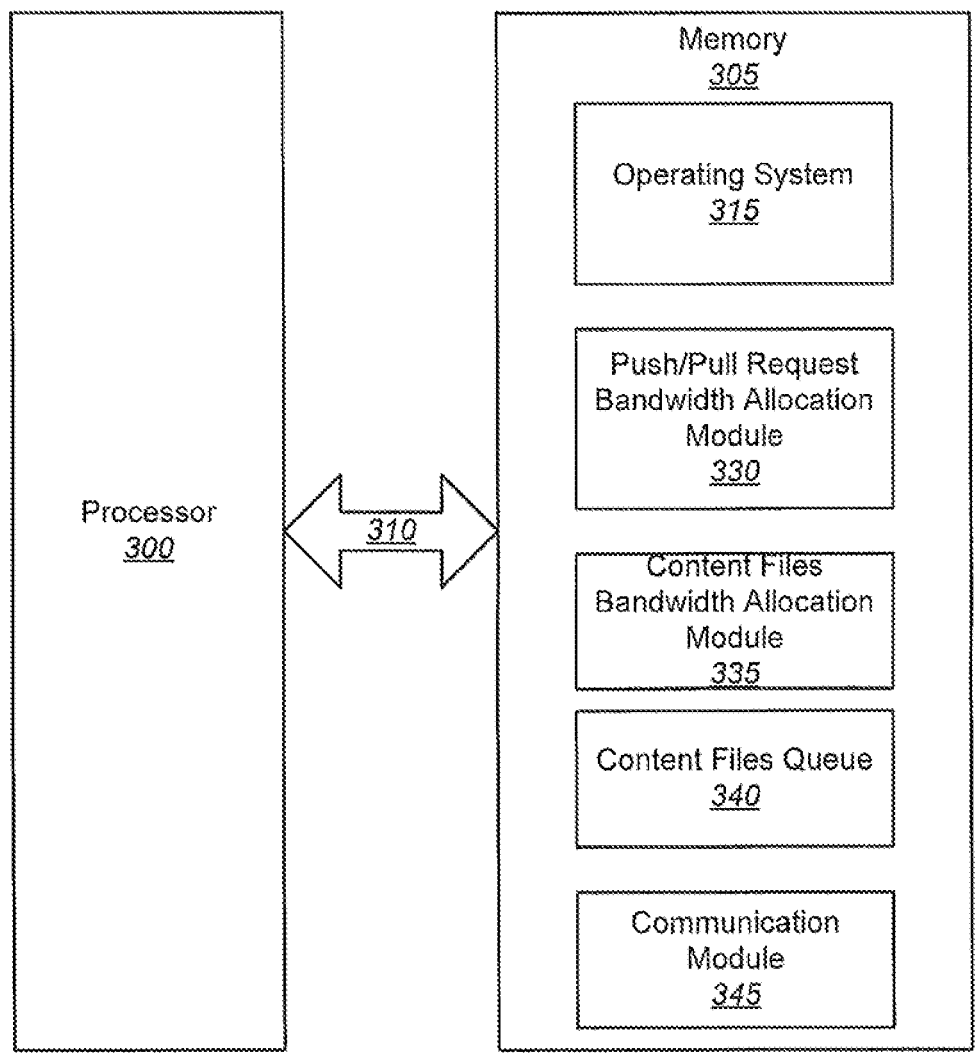
FIG. 3 is a block diagram that illustrates a software/hardware architecture for bandwidth allocation in a CDN server according to some embodiments of the inventive subject matter.

FIG. 3 illustrates a processor 300 and memory 305 that may be used in embodiments of data processing systems, such as the data processing system 200 of FIG. 2, for allocating bandwidth assigned to push and pull content requests on an outgoing communication link based on relative priorities assigned to the push and pull content requests and also for allocating bandwidth to individual content files within a push bandwidth portion or pipe and/or a pull bandwidth portion or pipe in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for allocating bandwidth in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to five or more categories of software and/or data: an operating system 315, a push/pull request bandwidth allocation module 330, a content files bandwidth allocation module 335, a content files queue 340, and a communication module 345. The operating system 315 generally controls the operation of the data processing system. In particular, the operating system 315 may manage the data processing system's software and/or hardware resources and may coordinate execution of programs by the processor 300. The push/pull request bandwidth allocation module 330 may be configured to allocate the bandwidth assigned to push and pull content requests on an outgoing communication link based on relative priorities assigned to the push and pull content requests. The content files bandwidth allocation module 335 may be configured to allocate bandwidth to individual content files within a push bandwidth portion or pipe and/or a pull bandwidth portion or pipe. The content files queue 340 may represent a queue where content files are stored while awaiting transmission on an outgoing communication link. The content files in the queue may be assigned various priorities relative to each other. These priorities may be associated with a particular communication pipe, e.g., a push pipe or a pull pipe or may be the same regardless of which pipe is used for transmission in accordance with various embodiments of the inventive subject matter. The communication module 345 may be configured to manage the communication protocols for transmitting content on an outgoing communication link according to some embodiments of the inventive subject matter.

Although FIG. 3 illustrates exemplary hardware/software architectures that may be used in data processing systems, such as the data processing system 200 of FIG. 2, for allocating bandwidth for transmitting content files in a CDN, for example, according to some embodiments of the inventive subject matter, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented in a variety of ways including, but not limited to, a single processor system, a multi-processor system, a multi-core processor system, or even a network of stand-alone computer systems, in accordance with various embodiments.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figures 4, 6:
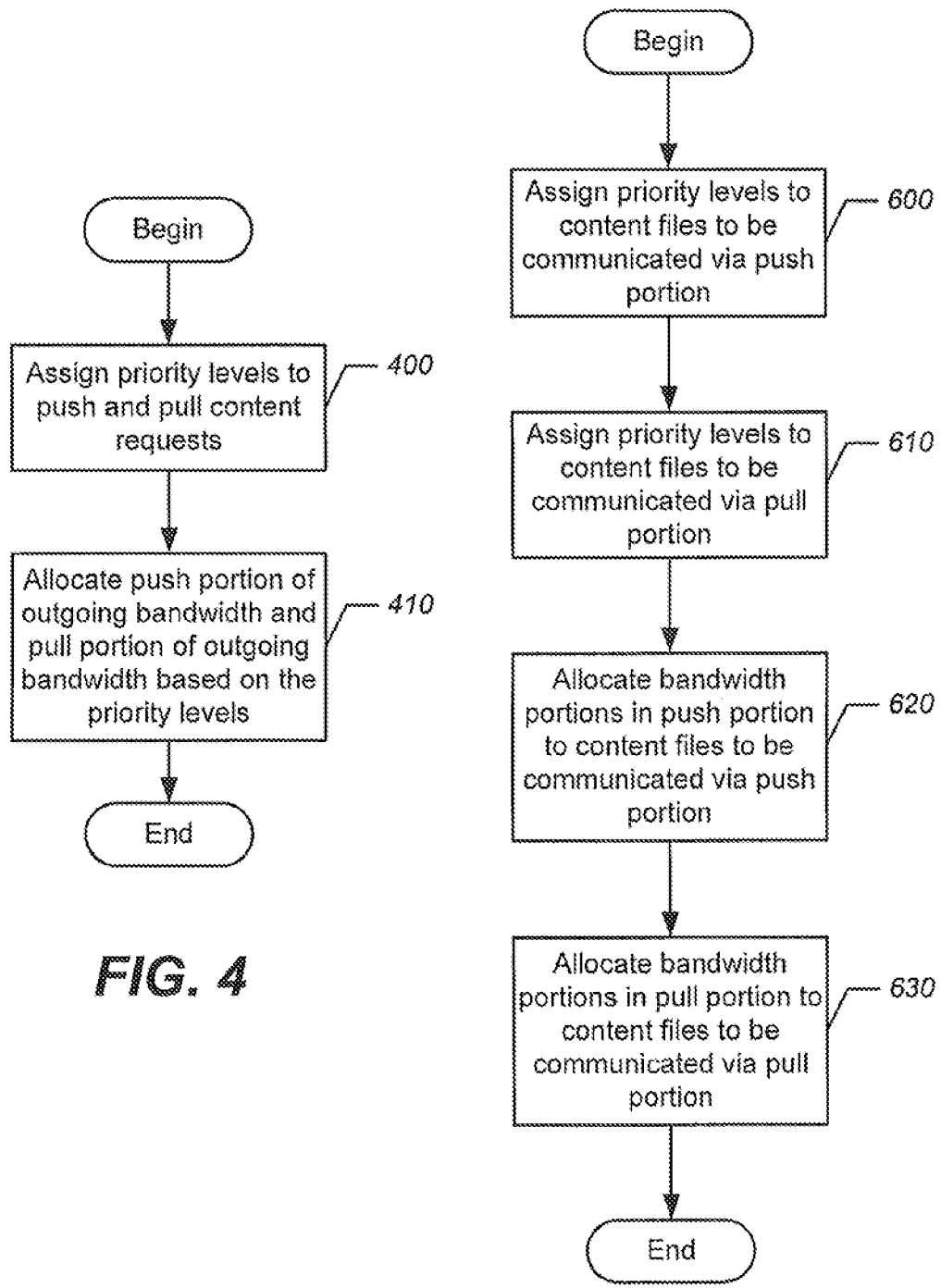
FIG. 4 is a flowchart that illustrates operations for allocating bandwidth based on priority levels assigned to push and pull content requests in a CDN according to some embodiments of the inventive subject matter.
FIG. 6 is a flowchart that illustrates operations for allocating bandwidth to content files within the push and pull portions of the bandwidth based on priority levels assigned to the content files according to some embodiments of the inventive subject matter.
Figure 5:
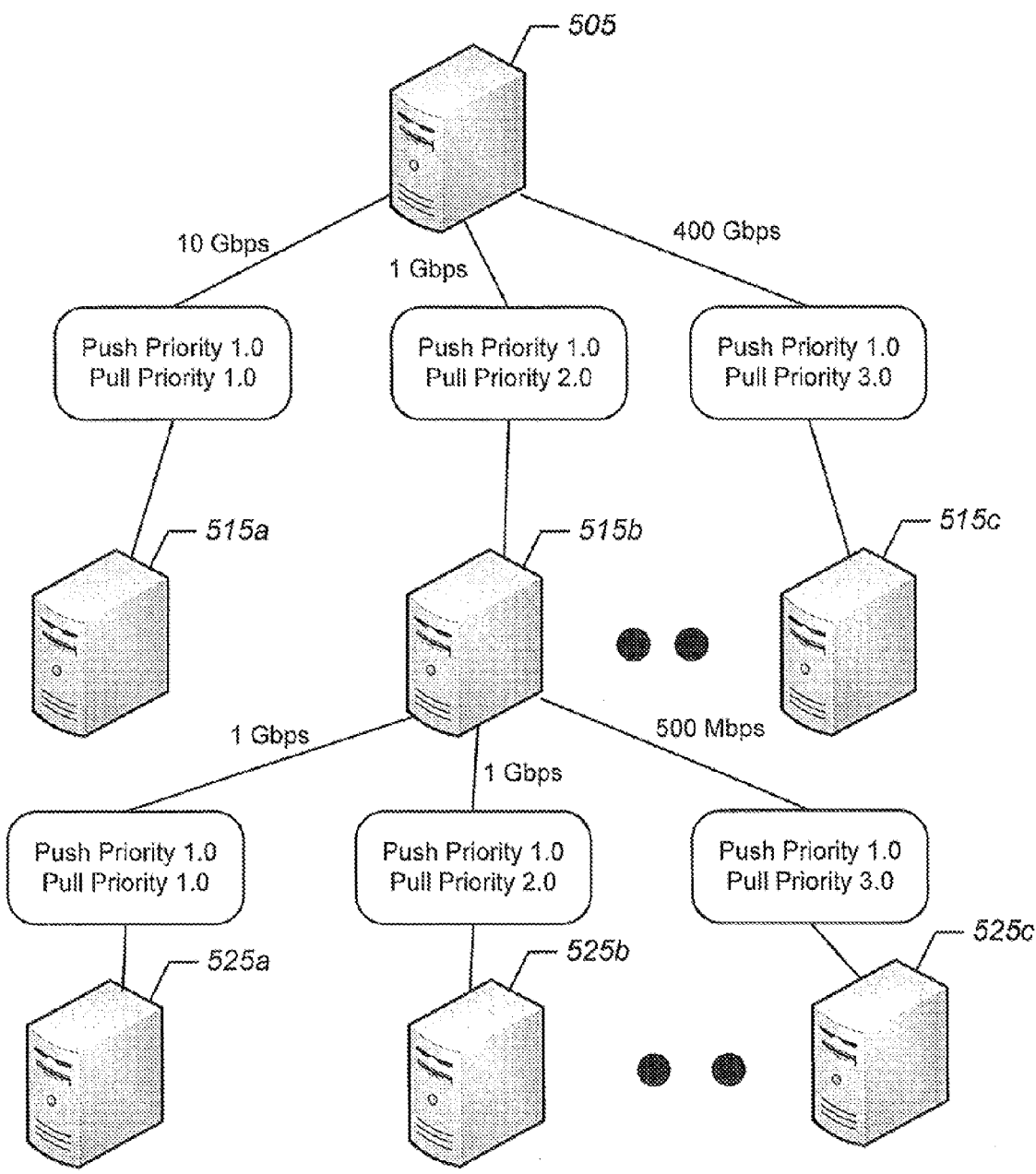
FIG. 5 is a block diagram of a CDN network that illustrates operations for allocating bandwidth based on priority levels assigned to push and pull content requests according to some embodiments of the inventive subject matter.
Figure 7:
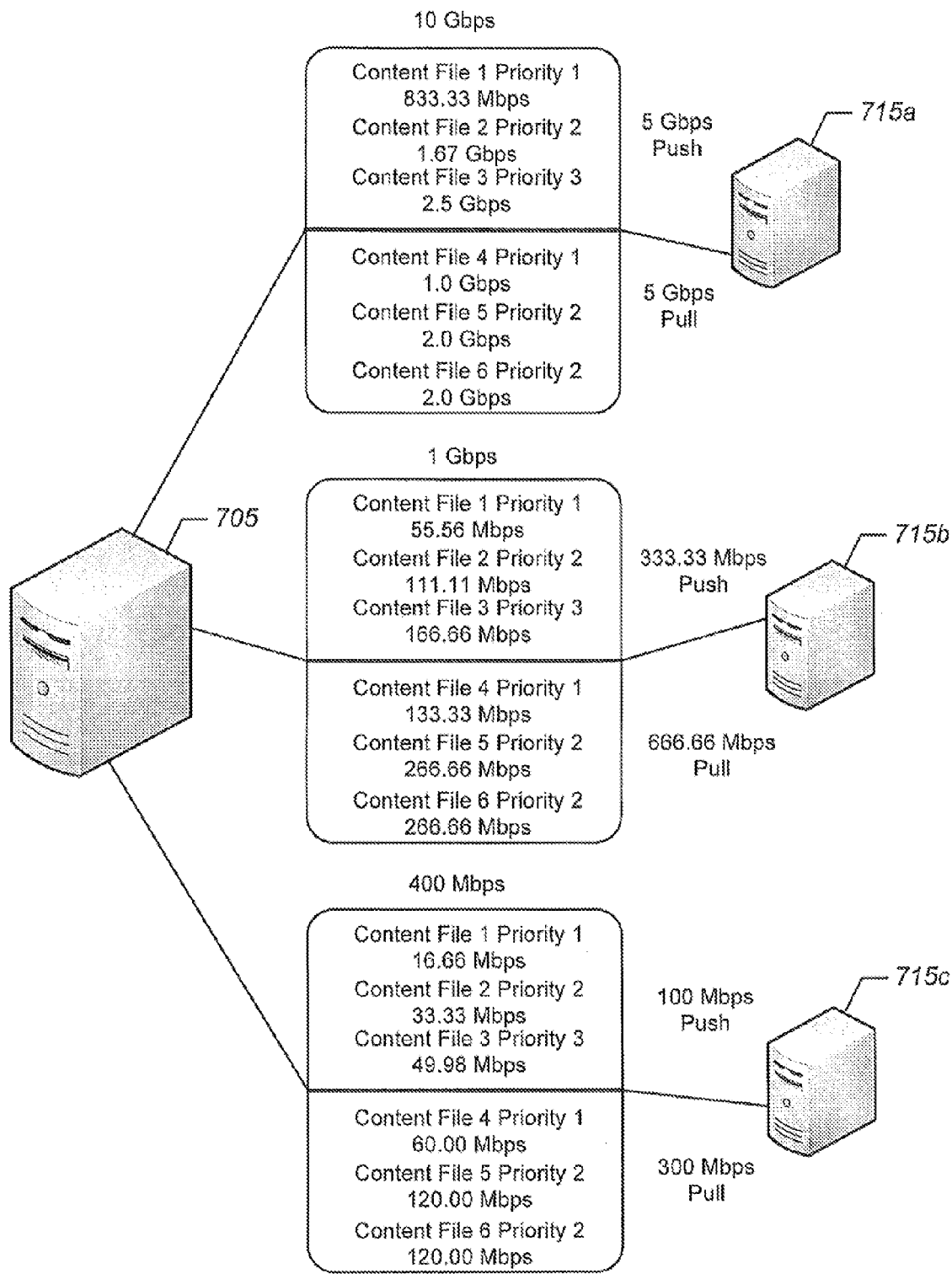
FIGS. 7 and 8 are block diagrams of a CDN network that illustrates operations for allocating bandwidth to content files within the push and pull portions of the bandwidth based on priority levels assigned to the content files according to some embodiments of the inventive subject matter.

Operations of a CON according to some embodiments of the inventive subject matter will now be described with reference to the flow charts of FIGS. 4, 6, and 9-11 and the network diagrams of FIGS. 5, 7, and 8. Referring now to FIG. 4, operations begin at block 400 where the push/pull request bandwidth allocation module 330 assigns priority levels to push and pull content requests. At block 410, the push/pull request bandwidth allocation module 330 partitions the outgoing bandwidth on a communication link so as to create a push portion of the outgoing bandwidth and a pull portion of the outgoing bandwidth based on the priority levels assigned at block 400. As shown in FIG. 5, a central data center server 505 has communication links to three regional servers 515a, 515b, and 515c with total bandwidth on the links of 10 Gbps, 1 Gbps, and 400 Gbps, respectively. The assigned priority levels for the push and pull content requests for the links to the three regional servers 515a, 515b, and 515c are shown in FIG. 5. For the communication link to regional server 515a, the priority levels for push content requests and pull content requests are the same so they will each be allocated the same portion of bandwidth. For the communication link to regional server 515b, the pull content requests have been assigned a priority level twice that of the push content requests. As a result, the portion of the outgoing bandwidth allocated for pull content requests will be twice that of the portion of the outgoing bandwidth allocated for push content requests. A similar analysis applies to the communication link between the central data center server 505 and the regional server 515c and between the regional server 515b and edge severs 525a, 525b, and 525c.

In addition to partitioning the bandwidth on an outgoing communication link to handle push and pull content requests based on priority levels assigned to the push and pull content requests, the bandwidth within the push and the pull portions of the total bandwidth may also be partitioned based on priority levels associated with particular content files. Referring now to FIG. 6, operations begin at block 600 where the content files bandwidth allocation module 335 assigns priority levels to the plurality of content files to be communicated via the push portion of the outgoing bandwidth. At block 610, the content files bandwidth allocation module 335 assigns priority levels to the plurality of content files to be communicated via the pull portion of the content bandwidth. The content files bandwidth allocation module 335 allocates portions of the push portion of the outgoing bandwidth to the plurality of content flies to be communicated via the push portion of the bandwidth at block 620 based on the priority levels assigned at block 600. The content files bandwidth allocation module 335 allocates portions of the pull portion of the outgoing bandwidth to the plurality of content files to be communicated via the pull portion of the bandwidth at block 630 based on the priority levels assigned at block 600. As shown in FIG. 7, the server 705 may represent the central data center server 505 of FIG. 5 and the servers 715a, 715b, and 715c may represent the regional servers 515a, 515b, and 515c of FIG. 5, respectively. The outgoing bandwidth between the central data center server 705 and the regional server 715a is 10 Gbps, which is divided in equal portions for push and pull content requests due to push and pull content requests having the same priorities assigned thereto as shown in FIG. 5. The push portion of the bandwidth is allocated to content files 1, 2, and 3 based on their relative priorities as shown in FIG. 7 with content file 3 getting half of the 5 Gbps allocated for push content requests, content file 2 getting one-third of the 5 Gbps allocated for push content requests, and content file 1 getting one-sixth of the 5 Gbps allocated for push content requests. A similar analysis applies to the communication links between the central data center server 705 and the regional servers 715b and 715c.

Figure 8:
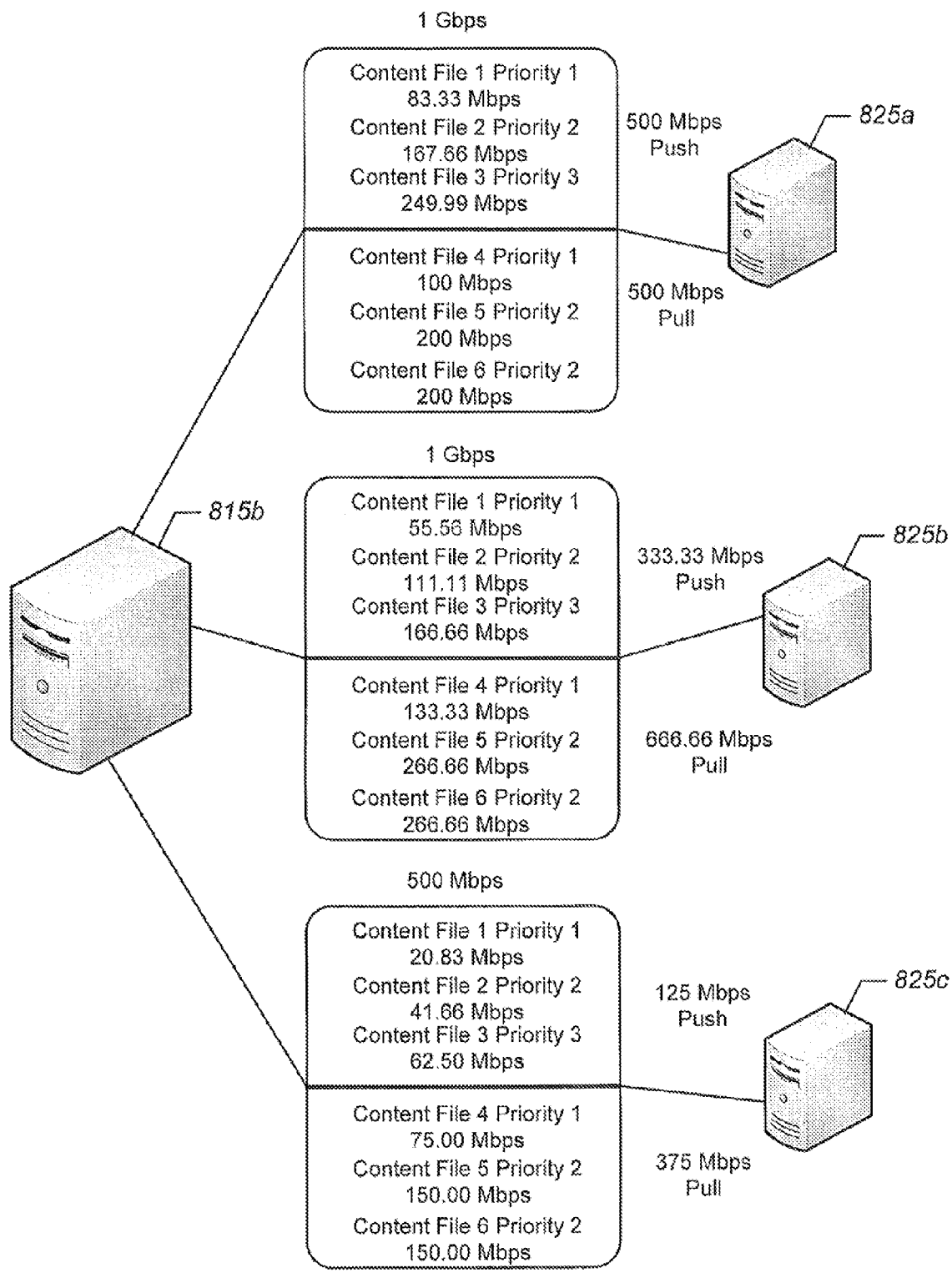

FIG. 8 illustrates a similar distribution of bandwidth for various content files within the push and pull portions of the bandwidth between a regional server and multiple edge servers. As shown in FIG. 8, the server 815b may represent the regional server 515b of FIG. 5 and the servers 825a, 825b, and 825c may represent the edge servers 525a, 525b, and 525c of FIG. 5, respectively. The outgoing bandwidth between the regional server 815b and the edge server 825a is 1 Gbps, which is divided in equal portions for push and pull content requests due to push and pull content requests having the same priorities assigned thereto as shown in FIG. 5. The push portion of the bandwidth is allocated to content files 1, 2, and 3 based on their relative priorities as shown in FIG. 8 with content file 3 getting half of the 500 Mbps allocated for push content requests, content file 2 getting one-third of the 500 Mbps allocated for push content requests, and content file 1 getting one-sixth of the 500 Mbps allocated for push content requests. A similar analysis applies to the communication links between the regional server 815b and the edge servers 825b and 825c.

Figure 9:
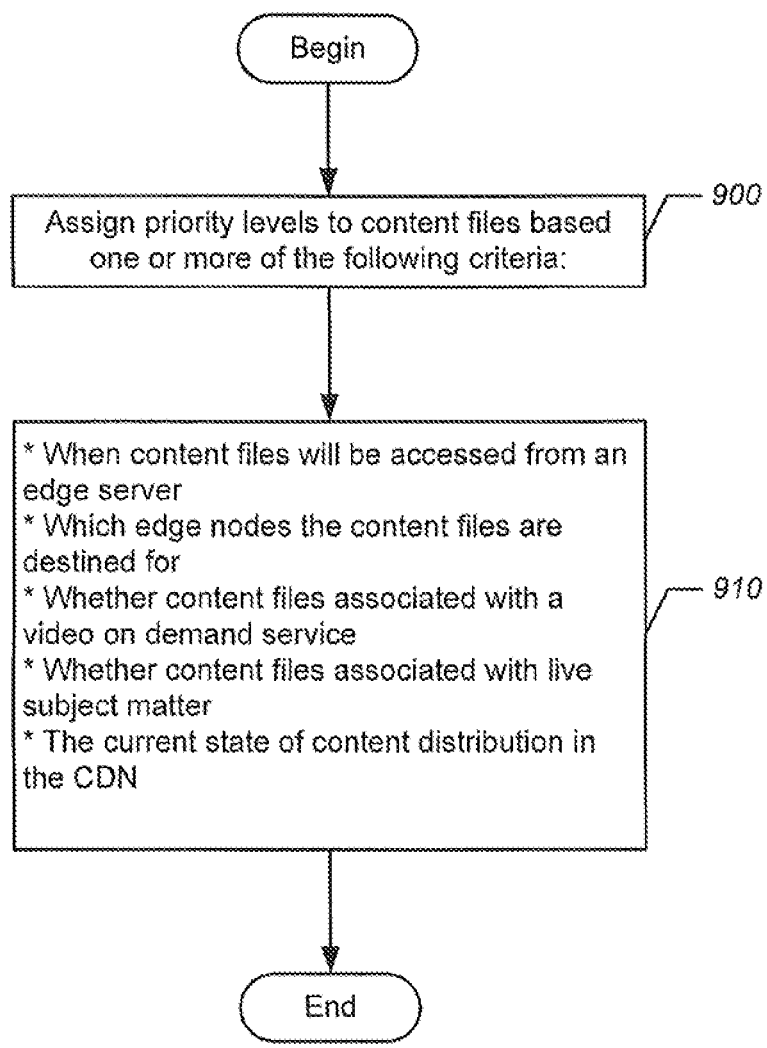
FIGS. 9-11 are flowcharts that illustrate further operations for bandwidth allocation in a CDN server according to some embodiments of the inventive subject matter.

Referring now to FIG. 9, at block 900 the content files bandwidth allocation module 335 assigns the priority levels to the individual content files comprising various streams of content, for example, based on criteria including, but not limited to when the content files will be access from an edge server, which edge nodes the content files are destined for, whether the content files are associated with a Video on Demand (VOD) service, whether the content files are associated with live subject matter occurring in real time, and/or the current state of content distribution in the CDN (block 910). In accordance with various embodiments of the inventive subject matter, the content files buffered, for example, in the content files queue 340 of FIG. 3 may include, but are not limited to, video files, audio files, voice files, and/or text file.

Figure 10:
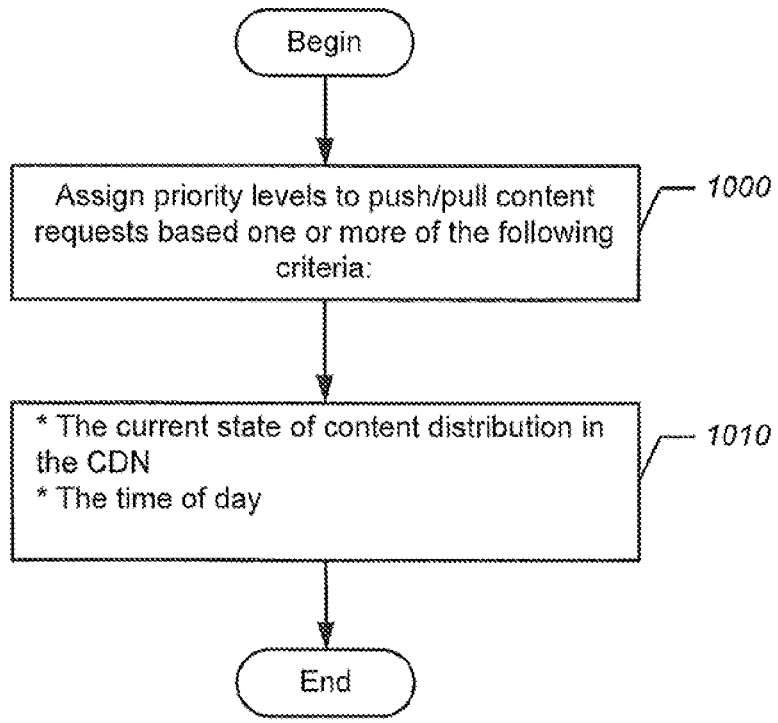
Figure 11:
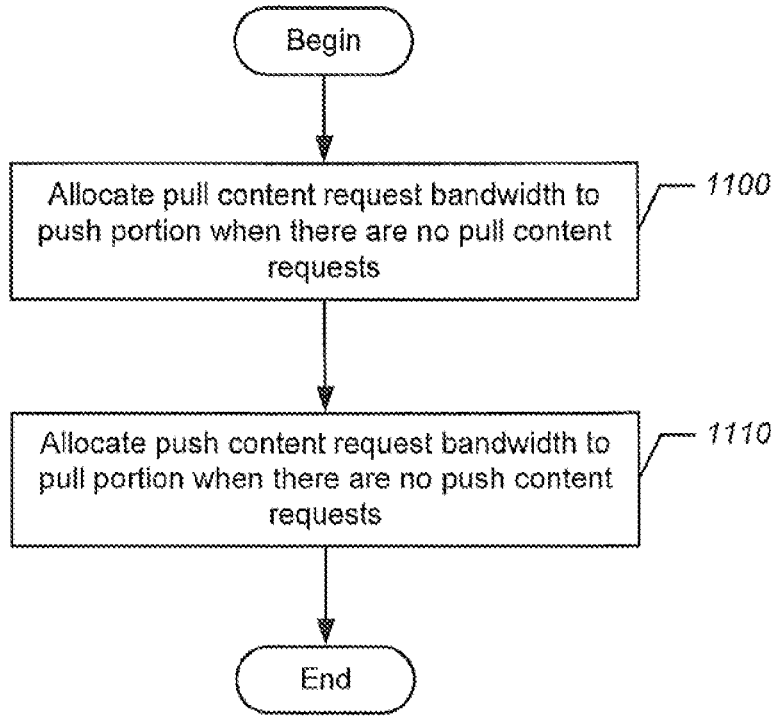

Referring now to FIG. 10, at block 1000 the push/pull request bandwidth allocation module 330 assigns the priority levels to push content requests and pull content requests, for example, based on criteria including, but not limited to the current state of content distribution in the Content Delivery Network (CDN) and/or the time of day, e.g., certain times of day may have relatively light pull content requests from users (block 1010). Referring now to FIG. 11, so as not to waste available bandwidth, when there are no pull content requests, the push/pull request bandwidth allocation module 330 re-allocates the bandwidth portion allocated to the pull content requests for push content requests at block 1100. Likewise, when there are no push content requests, the push/pull request bandwidth allocation module 330 re-allocates the bandwidth portion allocated to the push content requests for pull content requests at block 1110. Similar principles apply to the division of bandwidth between content files based on priority levels assigned to content files within the push and pull portions of the outgoing bandwidth.

Advantageously, embodiments of the inventive subject matter may allow for a more efficient transfer of files by dynamically adjusting the portions of bandwidth used for pushing content out to various nodes in a CDN and servicing pull requests for content from users. Lower priority content files can be transferred using push pipes in the CDN whose bandwidth is adjusted accordingly to deliver the files when they are needed at a destination while preserving as much bandwidth as possible to service higher priority user requests via a pull pipes in the CDN.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred, to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item front a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluaRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

That which is claimed:

1. A method of operating a content delivery network, comprising:
    subdividing outgoing bandwidth of a particular communication link connecting a first server and a second server in the content delivery network into a push pipe portion and a pull pipe portion based on relative priorities respectively assigned to handling push content requests and pull content requests, wherein the push pipe portion is operative for transporting content to be pushed through the particular communication link and the pull pipe portion is operative for transporting content to be pulled through the particular communication link;
    assigning priority levels to a first plurality of content files destined for the second server;
    partitioning the push pipe portion into a first plurality of portions and allocating the first plurality of portions to the first plurality of content files to be transmitted via the push pipe portion, respectively, based on the priority levels assigned to the first plurality of content files;
    assigning priority levels to a second plurality of content files destined for the second server; and
    partitioning the pull pipe portion into a second plurality of portions and allocating the second plurality of portions to the second plurality of content files to be transmitted via the pull pipe portion, respectively, based on the priority levels assigned to the second plurality of content files.

2. The method of claim 1, wherein assigning the priority levels to the first plurality of content files comprises assigning different priority levels to the first plurality of content files.

3. The method of claim 1, wherein assigning the priority levels to the second plurality of content files comprises assigning different priority levels to the second plurality of content files.

4. The method of claim 1, wherein assigning the priority levels to the first plurality of content files comprises assigning the priority levels to the first plurality of content files based on a plurality of edge node destinations in the content delivery network associated with the first plurality of content files, respectively.

5. The method of claim 1, wherein assigning the priority levels to the second plurality of content files comprises assigning the priority levels to the second plurality of content files based on a plurality of edge node destinations in the content delivery network associated with the second plurality of content files, respectively.

6. The method of claim 1, wherein assigning the priority levels to the first plurality of content files comprises assigning the priority levels to the first plurality of content files based on whether one or more of the first plurality of content files are associated with a video on demand service.

7. The method of claim 1, wherein assigning the priority levels to the second plurality of content files comprises assigning the priority levels to the second plurality of content files based on whether one or more of the second plurality of content files are associated with a video on demand service.

8. The method of claim 1, wherein assigning the priority levels to the first plurality of content files comprises assigning the priority levels to the first plurality of content files based on whether one or more of the first plurality of content files are associated with live subject matter occurring in real time.

9. The method of claim 1, wherein assigning the priority levels to the second plurality of content files comprises assigning the priority levels to the second plurality of content files based on whether one or more of the second plurality of content files are associated with live subject matter occurring in real time.

10. The method of claim 1, wherein assigning the priority levels to the first plurality of content files comprises assigning the priority levels to the first plurality of content files based on a current state of content distribution on the content delivery network.

11. The method of claim 1, wherein assigning the priority levels to the second plurality of content files comprises assigning the priority levels to the second plurality of content files based on a current state of content distribution on the content delivery network.

12. The method of claim 1, wherein the first plurality of content files and the second plurality of content files comprise video, voice, audio, and/or text.

13. The method of claim 1, further comprising assigning a priority level to the push content requests based on at least one of a current state of content distribution on the content delivery network and a current time of day.

14. The method of claim 1, further comprising assigning a priority level to the pull content requests based on at least one of a current state of content distribution on the content delivery network and a current time of day.

15. The method of claim 1, wherein the particular communication link is a first communication link, the method further comprising:
assigning priority levels to push and pull content requests, respectively, for a second communication link connecting the first server and a third server in the content delivery network; and
allocating a push portion of outgoing bandwidth from the first server to the third server for push content requests and a pull portion of the outgoing bandwidth from the first server to the third server for pull content requests based on the priority levels assigned to the push and pull content requests for the second communication link, respectively.

16. The method of claim 15, further comprising:
assigning priority levels to a first plurality of content files destined for the third server;
assigning priority levels to a second plurality of content files destined for the third server;
allocating a plurality of portions of the push portion of the outgoing bandwidth from the first server to the third server to the first plurality of content files, respectively, based on the priority levels assigned to the first plurality of content files; and
allocating a plurality of portions of the pull portion of the outgoing bandwidth from the first server to the third server to the second plurality of content files, respectively, based on the priority levels assigned to the second plurality of content files.

17. The method of claim 1, wherein the first server is network data center node in the content delivery network and the second server is a regional node in the content delivery network.

18. The method of claim 1, wherein the first server is a regional node in the content delivery network and the second server is an edge node in the content delivery network.

19. The method of claim 1, further comprising:
re-allocating the pull pipe portion of the outgoing bandwidth to the push pipe portion when there are no pull content requests irrespective of the relative priority levels assigned to the push and pull content requests, respectively; and
re-allocating the push pipe portion of the outgoing bandwidth to the pull pipe portion when there are no push content requests irrespective of the relative priority levels assigned to the push and pull content requests, respectively.

20. A first server, comprising:
at least one processor; and
at least one memory coupled to the processor, the at least one memory comprising computer readable program code that when executed by the at least one processor causes the processor to perform operations comprising:
subdividing outgoing bandwidth of a particular communication link connecting the first server and a second server in the content delivery network into a push pipe portion and a pull pipe portion based on relative priorities respectively assigned to handling push content requests and pull content requests, wherein the push pipe portion is operative for transporting content to be pushed through the particular communication link and the pull pipe portion is operative for transporting content to be pulled through the particular communication link;
assigning priority levels to a first plurality of content files destined for the second server;
partitioning the push pipe portion into a first plurality of portions and allocating the first plurality of portions to the first plurality of content files to be transmitted via the push pipe portion, respectively, based on the priority levels assigned to the first plurality of content files;
assigning priority levels to a second plurality of content files destined for the second server; and
partitioning the pull pipe portion into a second plurality of portions and allocating the second plurality of portions to the second plurality of content files to be transmitted via the pull pipe portion, respectively, based on the priority levels assigned to the second plurality of content files.

21. A computer program product, comprising:
a non-transitory computer readable program medium comprising computer readable program code embodied thereon, the computer readable program code when executed by a processor causes the processor to perform operations comprising:
subdividing outgoing bandwidth of a particular communication link connecting a first server and a second server in the content delivery network into a push pipe portion and a pull pipe portion based on relative priorities respectively assigned to handling push content requests and pull content requests, wherein the push pipe portion is operative for transporting content to be pushed through the particular communication link and the pull pipe portion is operative for transporting content to be pulled through the particular communication link;

assigning priority levels to a first plurality of content files destined for the second server;

partitioning the push pipe portion into a first plurality of portions and allocating the first plurality of portions to the first plurality of content files to be transmitted via the push pipe portion, respectively, based on the priority levels assigned to the first plurality of content files;

assigning priority levels to a second plurality of content files destined for the second server; and partitioning the pull pipe portion into a second plurality of portions and allocating the second plurality of portions to the second plurality of content files to be transmitted via the pull pipe portion, respectively, based on the priority levels assigned to the second plurality of content files.

* * * * *